Nov. 1, 1927.
P. A. LEA
RESILIENT TIRE
Filed June 29, 1926
1,647,871
2 Sheets-Sheet 2
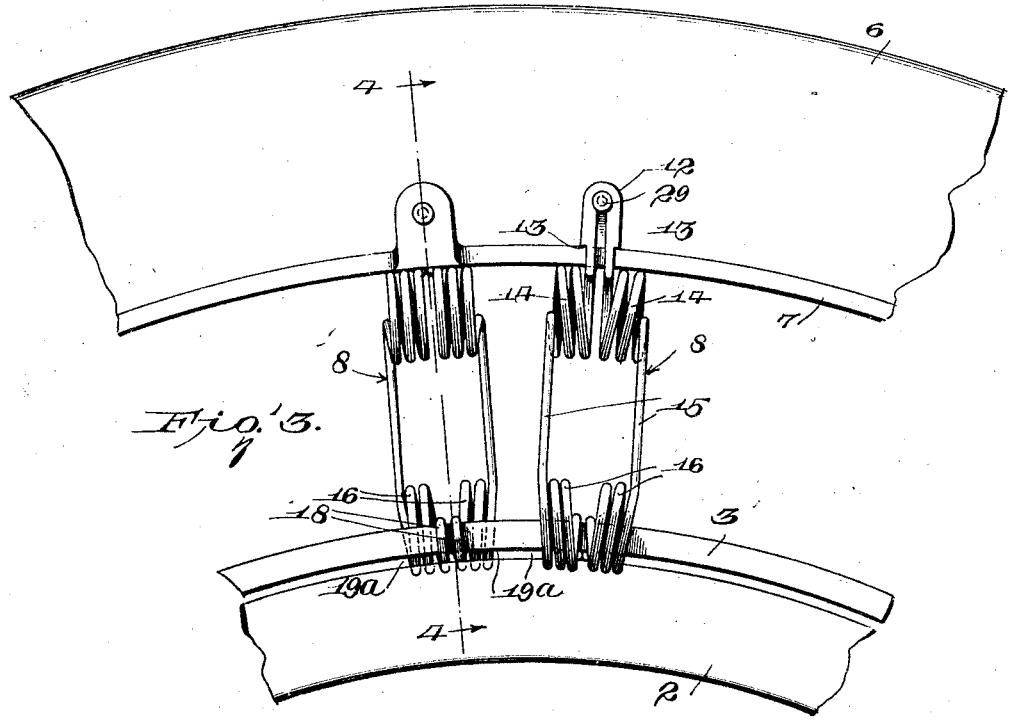
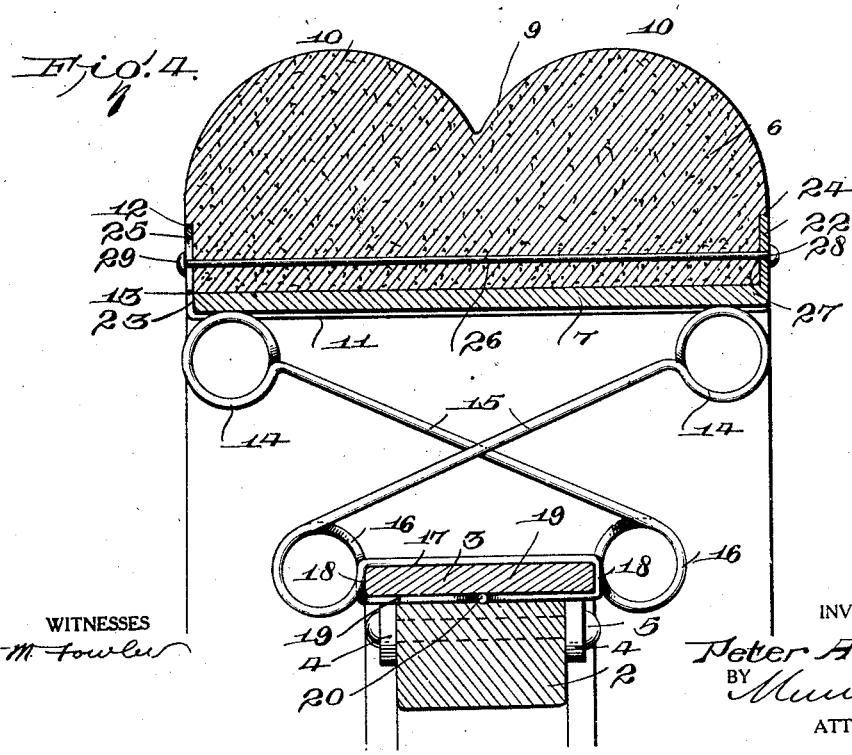
WITNESSES
M. Fowler
INVENTOR
Peter A. Lea
BY
Munn &co,
ATTORNEYS Patented Nov. 1, 1927.

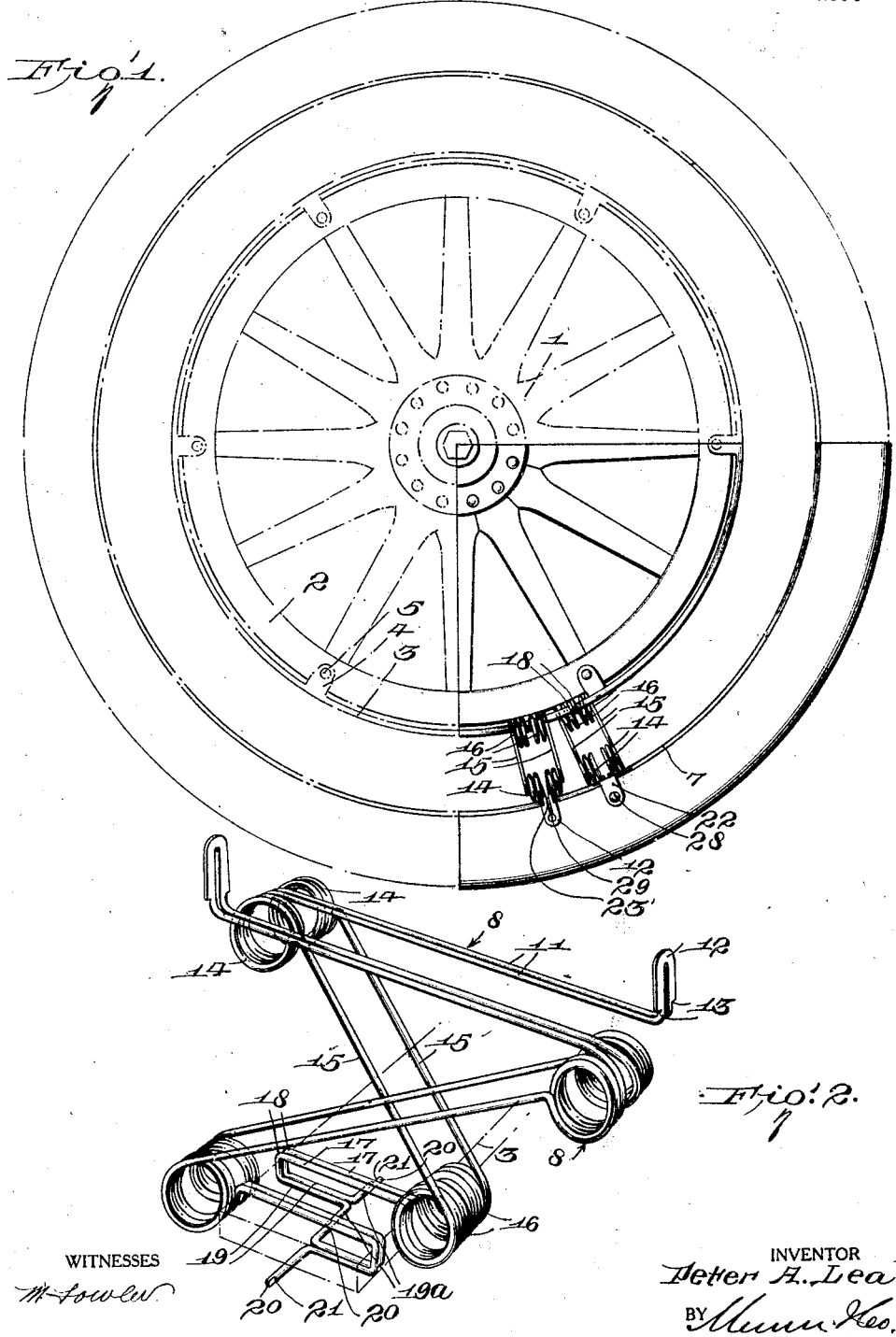

1,647,871

UNITED STATES PATENT OFFICE.

PETER APALUS LEA, OF NEW ORLEANS, LOUISIANA.

RESILIENT TIRE.

Application filed June 29, 1926. Serial No. 119,405.

My invention relates to improvements in resilient tires for vehicle wheels of the type which includes a plurality of spring members disposed on the rim of a wheel between the wheel rim and an annular tread member supporting ring, and it consists in the combinations, constructions and arrangements herein described and claimed.

More specifically described, the present invention contemplates the provision of an improvement over the resilient tire that is disclosed in Patent #1,536,225, granted to me May 5, 1925, said improvement including novel spring members arranged between the wheel rim and a resilient tread member supporting ring and adjacent spring members being adapted to engage with each other at their inner ends so as to prevent lateral spreading of the inner ends of the adjacent spring members should such spring members become weakened in service and the outer end portions of the spring members being adapted to engage with and to be connected with the tread member supporting ring so as to prevent displacement of the outer end portions of the spring members from the tread member supporting ring during the flexure of the spring members.

A further object of the present invention is to provide in a resilient tire of the character described novel spring members between the rim of the wheel and the tread member supporting ring which will permit relatively great radial flexure of the spring members under stress without the spring members disengaging the wheel rim or the tread member supporting ring.

Other objects and advantages of the invention will be apparent from the following description, considered in conjunction with the accompanying drawings, in which Figure 1 is a side elevation of a vehicle wheel equipped with a resilient tire embodying the invention with the spring members between the rim and the tread member supporting ring of approximately one-quarter of the tire shown and the remainder of the spring members omitted.

Figure 2 is a perspective view of a fragmentary portion of the wheel rim with two adjacent spring members thereon, Figure 3 is a side elevation of corresponding fragmentary portions of the rim structure of the wheel, the tread member, the tread supporting ring and a pair of adjacent spring members between the tread member supporting ring and the wheel rim, Figure 4 is a section substantially along the line 4—4 of Figure 3.

In Figure 1, the numeral 1 designates a wheel having a felly 2. A rim 3 is secured on the felly 2 in the usual manner, as by means of lugs 4 which extend radially inward from the edges of the rim 3 at the edges of the felly 2, and transverse fastening devices 5 which extend through transversely aligned lugs 4 and through the interposed portion of the felly 2.

An annular tread member 6, which may be made of rubber or other suitable material, is mounted on a resilient supporting ring 7 which is of greater diameter than the rim 3 and is resiliently supported on the rim 3 in spaced encircling relation to the latter by means of a circular series of radial spring members each of which is generally indicated at 8. The tread member 6 may have a circumferentially extending groove at 9 in its outer periphery intermediate the side edges of the tread member, said groove being substantially V-shaped in cross section so that the tread member 6 has two juxtaposed similar tread faces 10, each of which is convexly curved transversely thereof.

Each of the spring members 8 comprises a pair of parallel adjacent outer contact arms 11 adapted to extend transversely across the inner face of the ring 7 and each being merged at one end into one of the arms of a substantially U-shaped attaching member 12 which extends substantially at right angles with the arms 11. The arms of the substantially U-shaped attaching member 12 have inwardly facing shoulders 13 at their outer sides adjacent to the junctures of the arms of the attaching member 12 and the contact arms 11, said shoulders facing toward the plane of the arms 11 and the portions of the substantially U-shaped attaching member 12 outwardly of the shoulders 13 being flattened slightly in a plane which extends at right angles with the direction of length of the arms 11. The contact arms 11 are merged at their other ends into the inner convolutions of coil springs 14 which are located adjacent to each other and substantially in axial alignment with each other. The outer convolutions of the coil springs 14 are merged into inclined supporting members 15 which extend in parallel relation with each other and are spaced a distance approximately equal to the length of the two coil springs 14 combined. The inclined supporting members 15 are merged into the outer convolutions of a pair of adjacent axially aligned coil springs 16, the inner convolutions of which are continued as inner contact arms 17 which are adapted to extend across the outer peripheral face of the rim 3. The contact arms 17 are portions of substantially U-shaped rim engaging members 18 which are adapted to embrace an edge portion of the rim 3 and which have other arms 19 adapted to extend partially across the inner face of the rim 3 between the rim 3 and the felly 2. The free end portions of the arms 19 are turned away from each other at right angles with the remaining portions of the arms 19 as indicated at 19$^a$ and have longitudinally extending reduced end portions 20 which are produced by partially cutting away the ends of the members 19$^a$ at 21 for short distances from the extremities of the members 19$^a$ and at the sides of the members 19$^a$ which are nearest to the arms 19. With the construction just described, the axial lines of the coil springs 14—14 and 16—16 may be said to be offset outwardly from the places of juncture of convolutions of such coil springs with the associated arms of the spring member 8 and the spring member 8 thus is capable of relatively great flexure toward and away from the rim 3 with but relatively little torsional stresses on the coil springs 14—14 and 16—16.

The tread member supporting ring 7 is formed with alternately disposed lugs 22 and notches 23 in its opposite edges the lugs 22 extending radially outward from the ring 7 in lateral recesses 24 in the tread member 6 and the notches 23 being located radially inward from lateral depressions 25 in the tread member 6. Each lug 22 on an edge of the ring 7 is directly opposite a notch 23 in the edge of the ring 7. Each of the spring members 8 may be made of a single piece of spring wire suitably bent and formed to produce the hereinbefore described members. Each of the notches 23 is adapted for the reception of the portions of the arms of the substantially U-shaped attaching member 12 of a spring 8 inwardly of the shoulders 13 so that the shoulders 13 will bear against the outer face of the ring 7 and the bend portion of the substantially U-shaped attaching member 12 will be disposed opposite to a lug 22 on the opposite edge of the ring 7. A fastening rod 26 is projected through the bend portion of the attaching member 12, through the tread member 6 and through an aperture 27 in the associated lug 22, the ends of the fastening rod 26 then being upset as indicated at 28 and 29, respectively, thus not only connecting the outer end portion of the spring member 8 with the ring 7 but also securing the tread member 6 against displacement from position on the ring 7.

From the foregoing description of the various parts of the device, the operation thereof may be readily understood. The respective spring members 8 are arranged between the ring 7 and the rim 3 so that adjacent members 8 will be reversely disposed transversely of the rim 3 and the reduced end portions 20 at the ends of adjacent members 19$^a$ on the arms 19 of the rim engaging members 18 will overlap and engage with each other to prevent spreading of the rim engaging members 18 of adjacent springs 8 when said springs are contracted should the grip of the rim engaging members 18 of the springs 8 on the rim be loosened in service. The inner end portions of the springs 8 thus may be said to interlock to prevent shifting of the inner end portions of the springs 8 toward the edges of the rim 3. In addition, it will be understood that the rim 3 serves to clamp the members 19—19$^a$—20 of the rim engaging elements of the springs 8 to the felly 2 and that the portions 20 of the members 19$^a$ of the springs 8 are partially received in the cut away portions 21 of the springs 8.

Obviously, my invention is susceptible of embodiment in forms other than that which is illustrated in the accompanying drawings and I therefore consider as my own all such modifications and adaptations thereof as fairly fall within the scope of the appended claims.

I claim:—

1. In a resilient tire construction, the combination with a wheel rim of a ring encircling said rim and adapted for the support of a tread member, a plurality of spring members disposed between said ring and said rim and having their outer end portions engaged with said ring and their inner end portions engaged with said rim, said spring members having inclined supporting arms between said ring and said rim and adjacent spring members being reversely disposed tranversely of said rim so that the inclined supporting arms of adjacent spring members cross each other between said ring and said rim, and securing means extending transversely through the tread member and connected with the outer end portions of said spring members and with said ring.

2. In a resilient tire construction, the combination with a wheel rim of a ring encircling said rim and adapted for the support of a tread member, and a plurality of spring members disposed between said ring and said rim and having their outer end portions connected with said ring and their inner end portions engaged with said rim, the inner end portions of said spring members including elements extending at the inner side of said rim and having elements turned to extend circumferentially of said rim and overlapping so that the engagement of overlapping elements of adjacent spring members will prevent spreading of said inner end portions of said adjacent spring members toward the edges of said rim.

3. In a resilient tire construction, the combination with a wheel rim of a ring disposed in encircling relation to said rim, a plurality of spring members disposed between said ring and said rim, each of said spring members comprising a pair of adjacent parallel contact arms extending transversely across the inner face of said ring and substantially U-shaped attaching members joined to said contact members and extending across an edge of said ring beyond the outer periphery of said ring, said ring having lugs at its edges opposite to the substantially U-shaped attaching portions of the spring members, the attaching members of adjacent spring members being located at opposite edges of said ring, said substantially U-shaped attaching members having shoulders at the outer sides of the arms thereof bearing against the outer periphery of said ring and said ring having notches in its edges for the reception of the arms of the attaching members inwardly of said shoulders, a tread member disposed on said ring, fastening devices extending through said tread member and connecting the substantially U-shaped attaching members of the springs with the opposite lugs of said ring, and substantially U-shaped members at the inner ends of said springs embracing edge portions of said rim.

4. In a resilient tire construction, the combination with a wheel rim of a ring disposed in encircling relation to said rim, a plurality of spring members disposed between said ring and said rim, each of said spring members comprising a pair of adjacent parallel contact arms extending transversely across the inner face of said ring and substantially U-shaped attaching members joined to said contact members and extending across an edge of said ring beyond the outer periphery of said ring, said ring having lugs at its edges opposite to the substantially U-shaped attaching portions of the spring members, the attaching members of adjacent spring members being located at opposite edges of said ring, said substantially U-shaped attaching members having shoulders at the outer sides of the arms thereof bearing against the outer periphery of said ring and said ring having notches in its edges for the reception of the arms of the attaching members inwardly of said shoulders, a tread member disposed on said ring, fastening devices extending through said tread member and connecting the substantially U-shaped attaching members of the springs with the opposite lugs of said ring, and substantially U-shaped members at the inner ends of said springs embracing edge portions of said rim, said last named substantially U-shaped members of adjacent springs embracing opposite edge portions of said rim, said last named substantially U-shaped members of said springs including arms extending part way across the inner periphery of said rim and having end portions turned circumferentially of the rim, said end portions having reduced extremities and said reduced extremities of adjacent springs overlapping and engaging with each other to prevent spreading of said last named substantially U-shaped members of adjacent springs.

5. In a resilient tire, a spring member adapted to be disposed on a wheel rim, said spring member comprising a pair of outer contact arms adapted to extend transversely across the inner periphery of a tread supporting ring, said outer contact arms being parallel and adjacent to each other, the outer ends of said contact arms being merged into the arms of a substantially U-shaped attaching member, said substantially U-shaped attaching member being bent substantially at right angles with said contact arms, a pair of axially aligned torsion coil springs, the outer contact arms being merged into the inner convolutions of said coil springs, a pair of inclined supporting arms continuous with the outer convolutions of said coil springs, a second pair of axially aligned coil springs having outer convolutions also continuous with said inclined supporting arms, a second pair of parallel adjacent contact arms adapted to extend transversely across the outer periphery of the wheel rim, said second contact arms being continuous with the inner convolutions of the second named coil springs, and a pair of substantially U-shaped attaching members adapted to embrace an edge portion of said wheel rim and having their outer arms continuous with said second named contact arms, the inner arms of said last named substantially U-shaped attaching members being adapted to extend between said wheel rim and the felly of the wheel, said inner arms of the last named substantially U-shaped attaching members being turned oppositely adjacent to their extremities substantially at right angles with the remainder of said inner arms of the last named substantially U-shaped attaching members, said oppositely turned portions of the inner arms of the last named attaching members having longitudinally extending cut-away portions at their extremities and at the sides thereof nearest to the remaining portions of the inner arms of said second named substantially U-shaped attaching members.

PETER APALUS LEA.